Patented Feb. 24, 1931

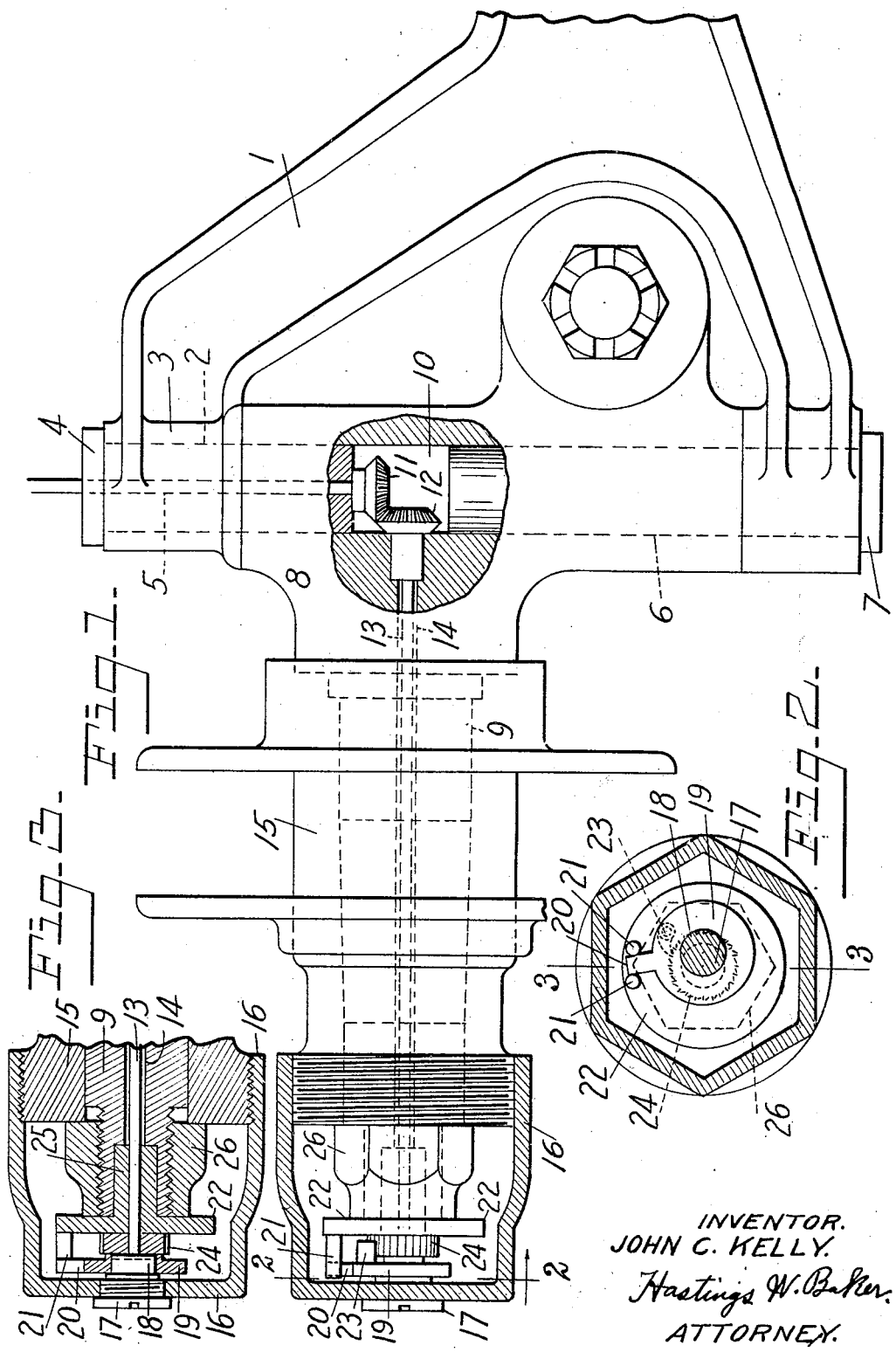

1,794,225

UNITED STATES PATENT OFFICE

JOHN C. KELLY, OF DAYTON, OHIO, ASSIGNOR TO OHMER FARE REGISTER COMPANY, OF DAYTON, OHIO, A CORPORATION OF NEW YORK

DRIVING MEANS

Application filed January 17, 1927. Serial No. 161,481.

The object of this invention is to provide a novel driving means for odometers, speedometers and the like.

One of the principal objects of the invention is to provide a driving means completely housed so as to prevent grit and other abrasive elements from entering the driving mechanism and causing damage thereto.

Another of the objects of the invention is to provide an extremely accurate driving means having the advantage of simplicity of construction.

Referring more particularly to the drawings,

Fig. 1 is a side elevational view of the front axle and spindle of an automobile having my invention incorporated thereon.

Fig. 2 is an elevational view partly in cross section on the line 2—2 of Fig. 1, and Fig. 3 is a cross-sectional view on the line 3—3 of Fig. 2.

The front axle 1 of an automobile is provided with two arms on each side thereof having apertures 2 in the outer ends of the arms. Instead of having a single bolt passing through the apertures 2, I provide a bolt 3 having a cap 4 through which passes a shaft 5, and a second bolt 6 having a cap 7 at its lower end. The bolts 3 and 6 are secured in place by any conventional means. The bearing 8 for the spindle 9 is rotatably mounted on the bolts 3 and 6 in the conventional manner. There is a chamber 10 provided between the inner ends of the bolts 3 and 6.

In the chamber 10 is mounted a beveled gear 11 secured to the shaft 5, which beveled gear drives a beveled gear 12 on the shaft 13 passing through a bore 14 extending through the spindle 9 and bearing 8. The hub 15 of the wheel is rotatably mounted on the spindle 9 in the conventional manner, which hub 15 has secured thereto a hub cap 16, which hub cap carries a screw 17 provided with an eccentric 18, which eccentric drives an eccentric strap 19 provided with an arm 20, which extends between two pins 21 secured to a plate 22 rigidly secured to the spindle 9. A nut 26 is secured on the spindle 9 whereby the hub 15 is held in place. The eccentric strap 19 is provided with pivoted pawl 23 which actuates ratchet 24 secured to the outer end of the shaft 13.

The eccentric 18 and screw 17 may be secured to the hub cap 16 in any conventional manner so that the screw will not be rotated relative to the hub cap but will remain in a fixed position therein. The disk 22 in like manner is secured to the spindle 9 so as to be held in immovable relation therewith, as, for instance, by providing the disk 22 with a boss 25 extending into the spindle 9, which boss serves as a bearing for the outer end of the shaft 13.

In operation the hub 15 and cap 16 rotate as the vehicle travels, thereby rotating the eccentric 18 and oscillating the eccentric strap 19, the upper end of which is held against rotation by means of the pins 21. The oscillation of the eccentric strap 19 rotates the ratchet 24 through the instrumentality of the pawl 23. The roation of the eccentric 18 is imparted to the shaft 13, beveled gears 11 and 12 and shaft 5, which motion is converted to the speed or mileage instrument, not shown, in any conventional manner.

It is obvious that many changes may be made in the specific form of the invention shown by way of example herein. I, therefore, desire to secure protection in regard to this invention regardless of modifications which may be made, and which may fairly fall within the scope of the appended claims.

Having described my invention, I claim—

1. In combination, a spindle provided with a central bore, a rotatable hub on said spindle, an eccentric rotated by said hub, a shaft rotatably mounted in said bore, and means operatively connecting said eccentric and shaft.

2. In combination, a spindle provided with a central bore, a rotatable hub on said spindle, an eccentric rotated by said hub, an eccentric strap oscillated by said eccentric, a shaft rotatably mounted in said bore, and means operatively connecting said eccentric strap and shaft.

3. In combination, a spindle provided with a central bore, a shaft rotatably mounted in said bore, a rotatable hub on said spindle, an eccentric rotated by said hub, an eccentric strap oscillated by said eccentric, an arm carried by said eccentric strap, guiding means for said arm, and means operatively connecting said eccentric strap and shaft.

4. In combination, a spindle provided with a central bore, a rotatable shaft within said bore, a rotatable hub on said spindle, an eccentric rotated by said hub, an eccentric strap oscillated by said eccentric, a pawl carried by said eccentric strap, and a ratchet connected to said shaft and engaged by said pawl whereby said shaft is rotated when said hub is operated.

5. In combination, a spindle provided with a central bore, a disk secured to said spindle, spaced pins carried by said disk, an eccentric strap, an arm carried by said eccentric strap, which arm passes between said pins and is guided thereby, means whereby said eccentric strap is oscillated, a ratchet carried by said shaft, and a pawl operatively connecting said eccentric strap and ratchet.

6. In combination, a front wheel axle of an automobile, a spindle pivoted thereto, a bolt provided with a bore serving as the pivotal connection between the spindle and axle, a rotatable hub on said spindle, a speed reduction means, an eccentric forming a part of said means and driven by said hub, a shaft passing through a bore in said spindle and operatively connected to said eccentric, a second shaft passing through a bore in said bolt, and beveled gears operatively connecting said shafts.

In testimony whereof I affix my signature.

JOHN C. KELLY.